United States Patent [19]

Wolff et al.

[11] 4,094,561
[45] June 13, 1978

[54] WIRING ENCLOSURE FOR DESKS

[75] Inventors: Douglas F. Wolff; Harold N. Minick; Jay J. Reinhart, all of Marshall, Mich.

[73] Assignee: Harter Corporation, Sturgis, Mich.

[21] Appl. No.: 808,188

[22] Filed: Jun. 20, 1977

[51] Int. Cl.² .................. A47B 77/08; H01R 13/60
[52] U.S. Cl. .................................. 312/223; 339/23
[58] Field of Search ...................... 312/223; 339/23

[56] References Cited

U.S. PATENT DOCUMENTS

| | | | |
|---|---|---|---|
| 2,860,404 | 11/1958 | Alden | 312/223 |
| 3,042,471 | 7/1962 | Haslup | 312/223 |
| 3,043,643 | 7/1962 | Wilmea | 312/223 |
| 3,204,545 | 9/1965 | Benson | 312/223 X |
| 3,497,281 | 2/1970 | Wilde | 312/223 |
| 3,676,974 | 7/1972 | Daly | 52/221 |
| 3,922,045 | 11/1975 | Meyer | 312/223 |

Primary Examiner—Paul R. Gilliam
Assistant Examiner—Victor N. Sakran
Attorney, Agent, or Firm—Hamilton, Renner & Kenner

[57] ABSTRACT

An elongated tubular enclosure, preferably of extruded plastic material, for mounting at the rear edge of a desk. The enclosure is adapted to encase the wiring running along the rear of the desk to supply electrical current to various appliances and equipment supported on or in proximity to the desk top, and has a front longitudinal slot through which wires can be conducted from within the enclosure to the desk top at any desired location. A flexible tapered wiper strip covers the slot and extends forwardly downward to lightly contact its front end with the desk top.

5 Claims, 6 Drawing Figures

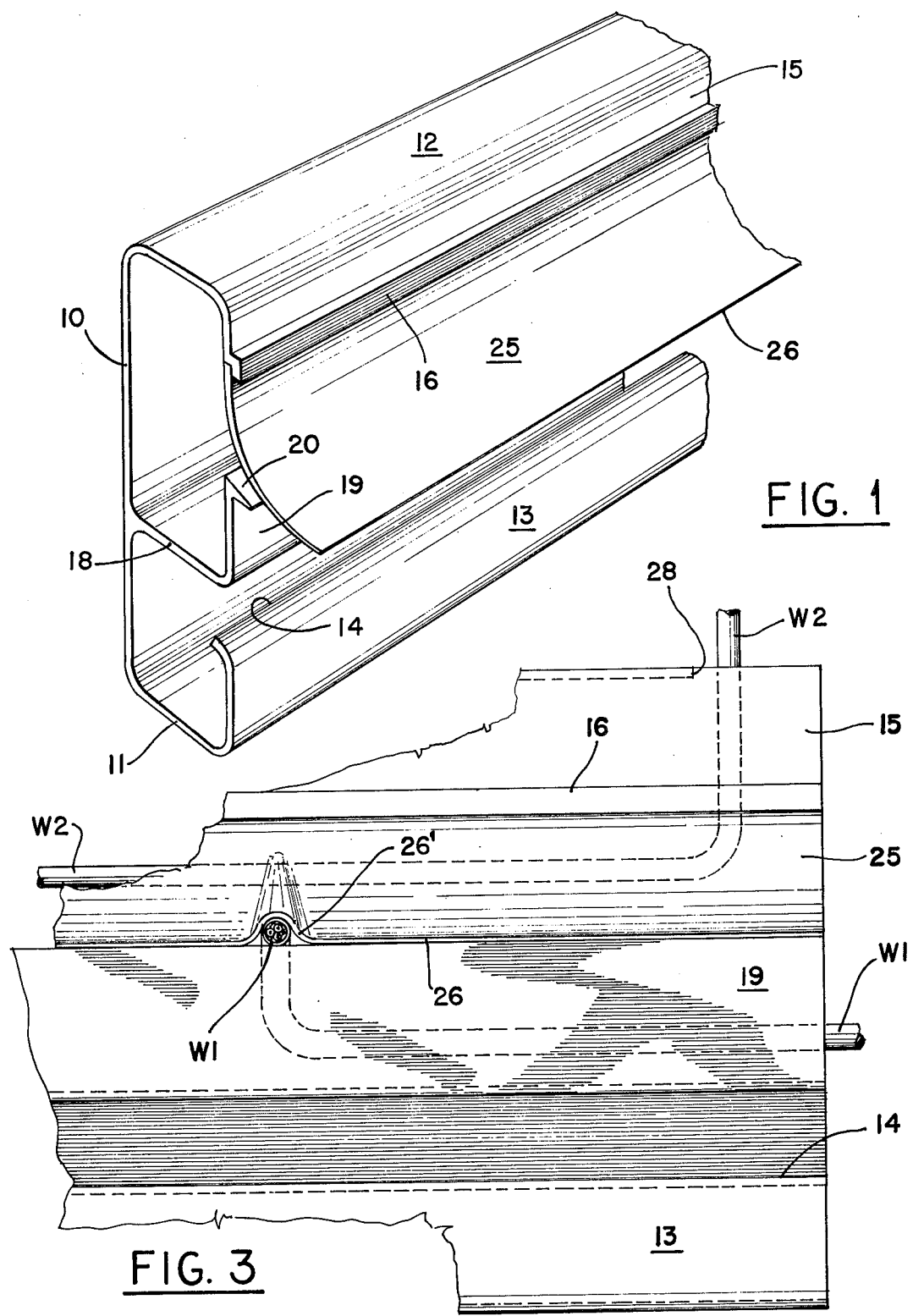

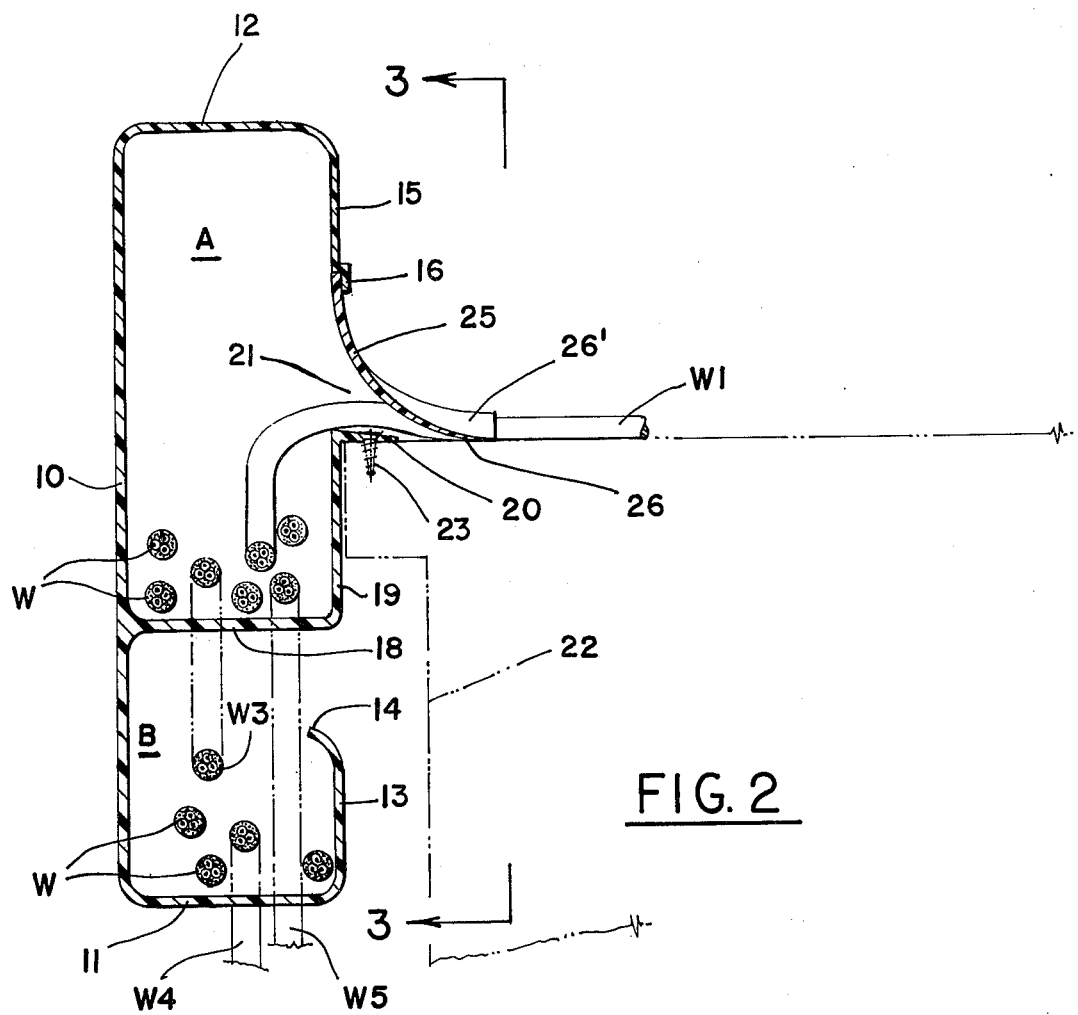
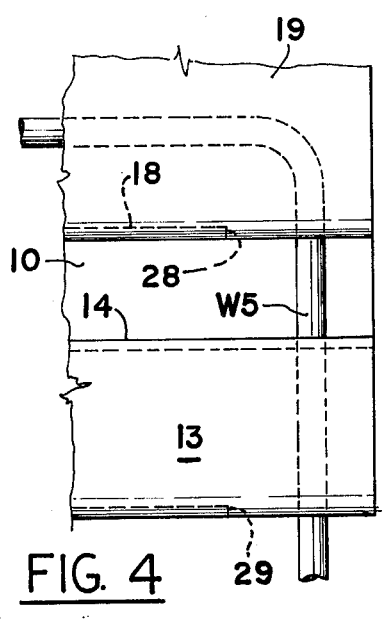
FIG. 4
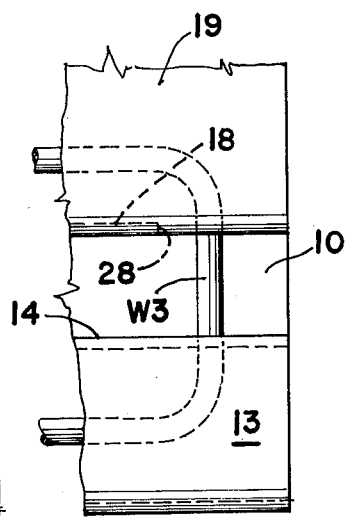
FIG. 5
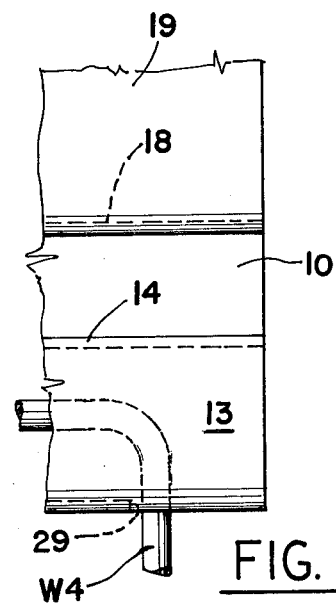
FIG. 6

WIRING ENCLOSURE FOR DESKS

BACKGROUND OF THE INVENTION

In many cases desks used for commercial and industrial purposes are required to support or mount various electrical and electronic equipment such as calculators, small motors, blowers, heaters, solder irons, welders, chargers, gauges, meters, timers, and the like. The wiring supplying electric current to such equipment frequently involves a large number of electrical conductors, especially where various pieces of equipment are involved, and consequently the wire conductors become unsightly and occupy a large amount of desk top working surface, to say nothing of becoming tangled and inconvenient. Wiring enclosures have been used which lay across the desk top, but these are unsightly and occupy a substantial portion of the desk top area.

SUMMARY OF THE INVENTION

It is an object of the present invention to provide an ornamental, inexpensive and functional wiring enclosure for mounting along the rear edge of a desk top.

Another object is to provide an improved elongated wiring enclosure for encasing wiring extending along the rear of the desk, and adapted to be made from extruded plastic material.

A further object is to provide an improved wiring enclosure for a desk which has a front access slot for conducting wires to the desk top.

Another object is to provide an improved wiring enclosure for a desk having a flexible tapered wiper strip covering the access slot with its lower thinner edge contacting the desk top.

A still further object is to provide an improved wiring enclosure having upper and lower compartments and adapted easily to be cut out to provide openings for incoming and outgoing wires.

These and other objects are accomplished by the improved wiring enclosure comprising the present invention, a preferred embodiment of which is shown by way of example in the accompanying drawings and described in detail in the following specification. Various modifications and changes in details of construction are comprehended within the scope of the appended claims.

BRIEF DESCRIPTION OF DRAWINGS

FIG. 1 is a front perspective view of a preferred embodiment of the improved wiring enclosure.

FIG. 2 is a cross sectional view thereof, showing the rear edge of the desk top in phantom, and a plurality of wire conductors extending longitudinally in each compartment, one of the conductors extending laterally through the front access slot and under the wiper strip.

FIG. 3 is a front elevational view party broken away, as on line 3—3 of FIG. 2, with a supply conductor wire entering through a cut-out in the top wall.

FIGS. 4, 5 and 6 are partial elevations, similar to FIG. 3, showing various cut-outs in the compartment walls for incoming and outgoing wire conductors.

DESCRIPTION OF A PREFERRED EMBODIMENT

The improved tubular wiring enclosure shown in the drawings is preferably formed from semi-rigid plastic material, such as polyvinyl chloride, extruded in suitable lengths to adapt to the widths of conventional desks. The tubular enclosure preferably has a flat vertical rear wall 10, a horizontal bottom wall 11 and a horizontal top wall 12. The bottom wall 11 is connected to a lower upstanding front vertical wall 13 preferably terminating in an inturned upper lip 14. The top wall 12 is connected to an upper depending front vertical wall 15 which terminates in an outwardly offset lip 16 forming an inner recess thereunder.

Spaced upwardly from the upper lip 14 of the lower front wall 13 is an intermediate horizontal partition wall 18 extending forwardly from rear wall 10 and connected to an upstanding intermediate front vertical wall 19 terminating in a right-angled forwardly extending attaching flange 20 which may be tapered as shown. The flange is spaced below the offset lip 16 so as to form a longitudinal access slot 21 coextensive with the tubular enclosure.

The access slot opens into an upper compartment A formed by rear wall 10, top wall 12, partition wall 18 and front walls 15 and 19, and a lower compartment B is formed by rear wall 10, bottom wall 11 partition wall 18, and lower front wall 13. The partition wall 18 functions as the bottom wall of compartment A. The enclosure may be easily mounted on the rear edge of the top of a desk, indicated in phantom at 22 in FIG. 2, by fitting the attaching flange 20 over the rear edge and inserting attaching screws 23 or the like.

A preferably curved flexible cover or wiper strip 25 is provided coextensive with the access slot 21, and the strip may be formed of relatively soft flexible vinyl material or other compatible plastic material. The upper edge of the strip 25 is inserted into the inner recess under the lip 16 and may be joined thereto by a suitable adhesive or by heat welding as desired. The cover is preferably tapered in thickness to a thin lower edge 26 which lays lightly on and conforms to the desk top surface.

As shown in FIGS. 2-6, a number of electrical wire conductors W may be enclosed in either or both of the compartments A and B, and any of the wires in compartment A may be brought through the access opening 21 onto the desk top in the manner indicated at $W_1$ in FIGS. 2 and 3, wherein the thin lower edge portion of the wiper strip curves around the wire as shown at 26'.

In order to enter a supply wire or wires $W_2$ from above, an opening 27 may be cut out of the top wall 12, as indicated in FIG. 3. Similarly, an opening 28 may be cut out of partition wall 18 to transmit a wire or wires $W_3$ from the lower compartment B to upper compartment A as in FIG. 5, or an opening 29 may be cut out of bottom wall 11 to enter a wire or wires $W_4$ into compartment B from below, as in FIG. 6, or vertically aligned cut-out openings 28 and 29 may be formed to pass an incoming wire or wires $W_5$ from below through compartment B into compartment A as in FIG. 4.

It will be apparent from the foregoing description that an inexpensive and ornamental enclosure for encasing wiring is provided which is easily attached to the rear edge of a desk top and affords ready access to the wiring compartments from above and below, and from the wiring compartments to the desk top surface while completely encasing the wires passing onto said surface.

We claim:

1. An elongated tubular integral wiring enclosure adapted for mounting at and extending above the rear of a desk top comprising walls forming an upper longitudinal compartment having a front wall, a longitudinal access slot formed in said front wall with an angular attaching flange along its lower edge for attachment to the desk top, walls forming a lower compartment under the upper compartment and a coextensive flexible wiper strip secured to the upper edge of said access slot and extending downwardly and forwardly over said attaching flange to conceal the same and to contact the desk top surface.

2. An elongated tubular wiring enclosure as defined in claim 1 wherein the compartment walls are of extruded semirigid plastic material and the wiper strip is of relatively soft flexible plastic material.

3. An elongated tubular wiring enclosure as defined in claim 1, wherein the wiper strip is tapered to a thinner lower edge.

4. An elongated tubular wiring enclosure as defined in claim 2, wherein the wiper strip is tapered to a thinner lower edge.

5. An elongated tubular wiring enclosure, as defined in claim 1, wherein said first compartment has a top wall, a rear wall and a bottom wall connected to said front wall, and said second compartment has a front wall the upper edge of which is spaced below the bottom wall of said first compartment.

* * * * *